United States Patent [19]

Kondo

[11] Patent Number: 5,257,618
[45] Date of Patent: Nov. 2, 1993

[54] ENDOSCOPE
[75] Inventor: Mituo Kondo, Omiya, Japan
[73] Assignee: Fuji Photo Optical Co., Ltd., Omiya, Japan
[21] Appl. No.: 788,417
[22] Filed: Nov. 6, 1991
[30] Foreign Application Priority Data Nov. 6, 1990 [JP] Japan ................................. 2-298815

[51] Int. Cl.$^5$ .............................................. A61B 1/00
[52] U.S. Cl. ........................................ 128/4; 138/120
[58] Field of Search .............. 138/120, 118; 128/4; 604/95, 280

[56] References Cited

U.S. PATENT DOCUMENTS

| | | | |
|---|---|---|---|
| 3,266,059 | 8/1966 | Stelle | 128/4 X |
| 4,236,509 | 12/1980 | Takahashi et al. | 128/4 |
| 4,452,236 | 6/1984 | Utsugi | 128/4 |
| 4,655,257 | 4/1987 | Iwashita | 128/4 X |
| 4,904,048 | 2/1990 | Sogawa et al. | 128/4 SM |

FOREIGN PATENT DOCUMENTS 5089182 7/1975 Japan .

*Primary Examiner*—Richard J. Apley
*Assistant Examiner*—Karen A. Jalbert
*Attorney, Agent, or Firm*—Oblon, Spivak, McClelland, Maier & Neustadt

[57] ABSTRACT

An endoscope has a flexible insert portion that is inserted into an object to be inspected. A light guide, an image guide or signal cable, an instrument channel and other lengthwise members are provided therein. At least one elastic restoring body is provided in the insert portion in order to restore the lengthwise members to their original positions when straightened back after bending or curving of the insert portion.

5 Claims, 6 Drawing Sheets

ENDOSCOPE

BACKGROUND OF THE INVENTION

1. Field of the Invention

This invention relates to an endoscope for medical or industrial purposes, for example, for internal examination or diagnosis of patients' bodies, engines, nuclear reactors or other equipment.

2. Description of the Prior Art

An endoscope generally comprises a control unit, an insert portion connected to the control unit to be inserted into the inner cavity of human body or machine to be inspected, and a universal cord connected to a light source (or a combination of a light source and a processor with an electronic endoscope). The insert portion generally has, from the side of the control unit, a flexible section comprising a greater part of the insert portion which can be curved in any direction along the course of insertion, a bending section connected to the remotest end of the flexible section, and a distal end section connected to the end of the bending section. At the foremost end or the side of the distal end section there is provided an observation window, a light emitting window, an instrument gateway, etc. The bending portion is so designed as to direct the distal end portion toward the desired direction. To permit this operation, the bending section has a series of rings forwarding pivotal joints so as to facilitate being bent vertically or in both a vertical and horizontal direction by pushing and pulling control wires provided between the control unit and the distal end section of the insert portion or the tip end of the bending ring.

In addition to the control wires, a light guide in the form of an optical fiber bundle for emitting light is provided in the insert portion. Also, other lengthwise members are placed throughout the insert portion, such as an image guide fiber bundle for transmitting the image of the object to be observed in an optical endoscope and a cable connected to a solid image pickup means in an electronic endoscope. Further, provided therethrough are, for example, a channel to pass through forceps or other instruments and a fluid duct to feed a detergent and air to wash the observation window. All these lengthwise members mounted in the insert portion are flexible so that they can be deformed by being bent or being curved by the flexible and bending sections thereof.

When the insert portion is bent or curved, length differences arise regarding the members along with the side of inner periphery and the outer side periphery of the curved portion. The bending section, in particular, is so designed a to be bent over 180° in order to allow broader observation of the target. Thus, a considerable length difference of the lengthwise members will exist when these members are positioned either on the inner side or outer sides of the curved portion. Because the bending section can normally be bent in both vertical and horizonal directions, all members in the insert section are moved in arbitrary directions. To prevent damage by the excessive tension or compression on the bending section when being bent, each member is made extra long so as to allow for their axial movements to a predetermined degree.

The insert section must be as thin as possible so that it can be smoothly passed through narrow parts of the insertion passage without causing significant pain to the patient being inspected. As a consequence, there is a great deal of concern regarding the space required by the members in the insert section.

When an endoscope thus constructed is operated so as to bend the bending section, the members in the insert section move arbitrarily, thereby pressing, pushing or twisting each other, resulting in breaking the extra-fine optical fibers of the light guide and the image guide or cables of an electronic endoscope and causing kinks in the instrument channel or fluid ducts. During repeated operation of the endoscope, in particular, such lengthwise members in the insert section are gradually gathered and jammed in the bending section by being bent at large angles, and therefore the density of these members becomes extraordinary high at this particular portion. If the insert section is bent under this highly crowded condition, the aforesaid risks of breaking and kinking will be further increased.

There is known a method of keeping the members in the insert section respectively at the fixed positions in order to prevent their twinning, contacting and pressing each other by filling the bending section with foamed plastic materials. The foamed plastic thus packed in the bending section facilitates not only preventing movement of the members positioned therein but also exhibits a shock absorbing function, thereby reducing the possibility of damage. But this prior art is not completely problem-free.

The foamed plastic filled in the bending section causes increased resistance against the bending thereof, thus increasing the bending torque and impeding smooth operation thereof. Further, there is means in the prior art for control the movement of the members located in the flexible section so that there is thus no way to prevent their meandering or twinning therein.

The control wires for turn or bending the bending section are normally provided at four points in this section, i.e., at the top, bottom, right and left, at angular intervals of 90° to one another. However, these control wires are wound on a pair of pulleys coaxial with bending knobs mounted on the side of the control unit so that the wires are not fixed in the flexible section. Upon operation of the bending section, therefore, the instrument channel, fibers of the light guide and image guide may easily be pinched between the control wires and be damaged. Such a problem can not be avoided by the prior art. Especially, the greater part of the insert portion is constituted by the flexible section having no mean to fix the content members and these members secured at the distal end section, so that when repeatedly operating the bending action, these lengthwise members are pulled toward the bending section so as to be gathered and jammed therein, thereby increasing the risk of pinching and damaging them by the control wires in the flexible section.

Foamed plastic can be filled not only in the bending section but also in the entire insert portion including the flexible section. By so doing, greater protection is available to the content members, but this causes detrimental disadvantages such as the bending section becoming heavier.

SUMMARY OF THE INVENTION

Accordingly, it is an object of the invention to provide an endoscope that satisfactorily protects the lengthwise flexible members in the insert portion without causing deterioration of the bending operation property.

A more concrete object of this invention is to provide an endoscope that does not offer much resistance to bending of the bending and flexible sections of the insert portion while permitting the lengthwise members therein to return to or be restored to their original position after release of the bending force.

To achieve the above objects, the present invention is so constructed that, in an endoscope having lengthwise members in a flexible insert portion adapted to be inserted into an object to be inspected, it is characterized in that at least one elastic restoring body is provided in said insert portion so as to restore said members to their predetermined position when said insert portion is straightened back from a bent or curved shape.

The above and other objects, structures, functions and effects, and advantages of the invention will become apparent from the following detailed description and the appended claims, taken in conjunction with the accompanying drawings showing by way of example preferred embodiments of the invention.

BRIEF DESCRIPTION OF THE DRAWINGS

In the drawings:

FIG. 1 is an overall view of an endoscope;

FIG. 2 is an exterior view of the tip of an insert portion thereof;

FIG. 3 is a cross-sectional view of a bending section thereof;

FIG. 4 is an exterior view of a ring joint assembly of the bending section, with the members therein being omitted;

FIG. 5 is a partial cross-sectional view of a flexible section thereof;

FIG. 6 is a cross-sectional view taken along line VI—VI of FIG. 5;

FIG. 7 schematically shows an area of the flexible segment where a restoring member is fitted;

FIGS. 8 (a) and (b) are exterior and cross-sectional views of the bent flexible section;

FIG. 9 is an exterior view of a piece of sponge used as the restoring body;

FIG. 10 schematically shows an area of the flexible section where the piece of sponge is fitted, with omitted details of the sheath member.

DESCRIPTION OF THE PREFERRED EMBODIMENTS

Referring now to the accompanying drawings, a detailed description of the preferred embodiments of this invention will be given below.

Figure 1:
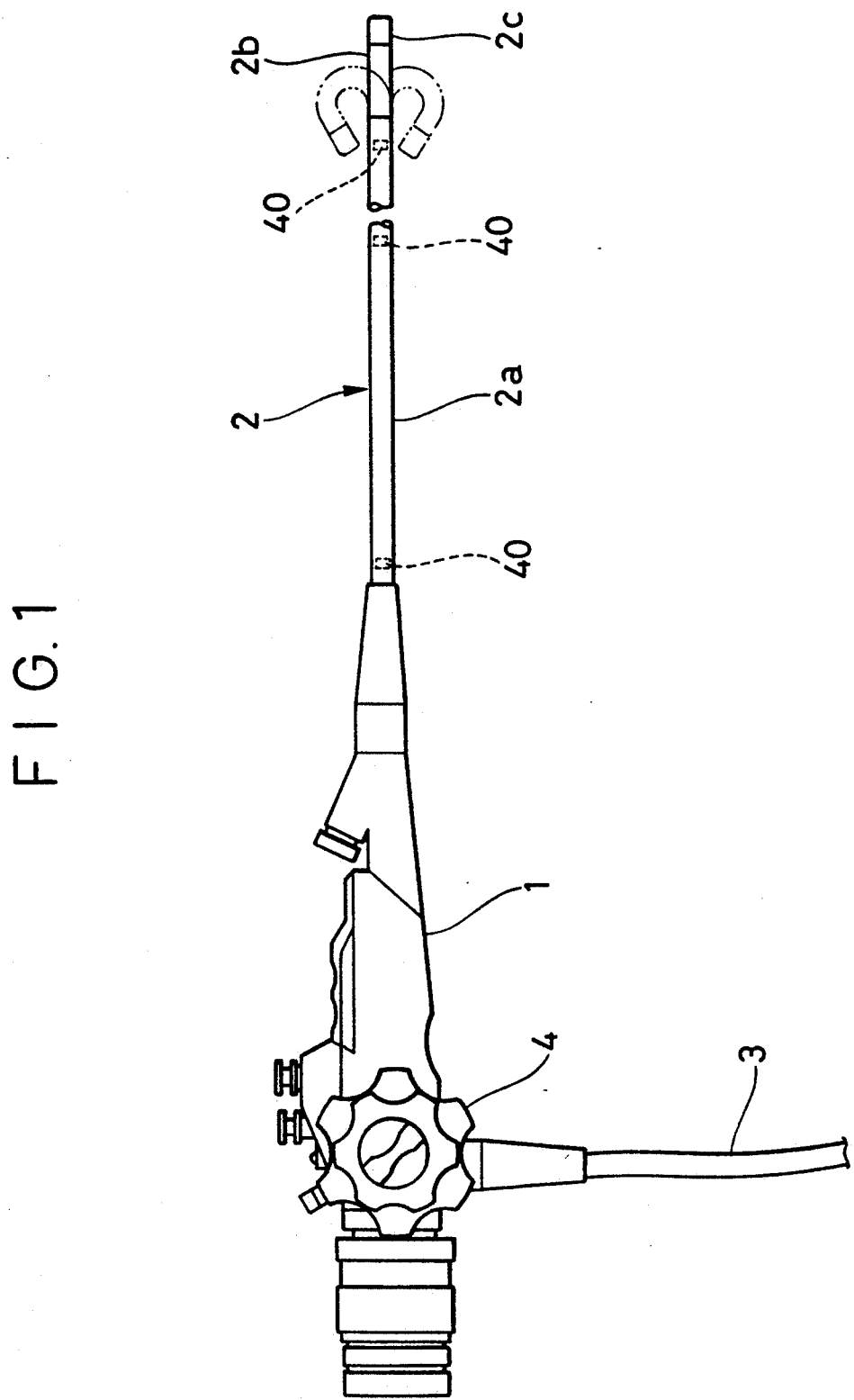
FIGS. 1 to 8 show a first preferred embodiment of this invention.

FIG. 1 shows the overall structure of an endoscope according to this invention.

In the drawing, reference numerals 1, 2 and 3 respectively designate a control unit, an insert portion and a universal cord. The portion 2 is divided into three sections consisting of an insert flexible section 2a, a bending section 2b and a distal end section 2c, from the side connected to the control unit 1.

Figure 2:
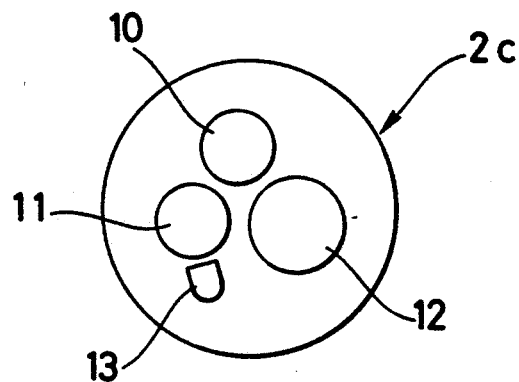

As shown in FIG. 2, the distal end section 2c has a light emitting window 10, an observation window 11, an instrument gateway 12 through which forceps or other instruments are taken in and out, and a nozzle 13 to feed washing fluids to the observation window 10.

Figure 3:
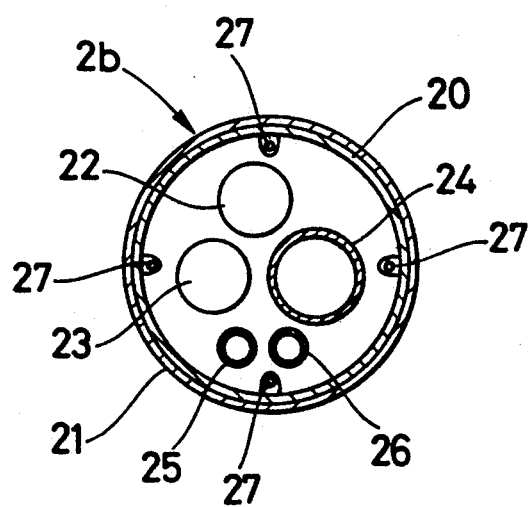
Figure 4:
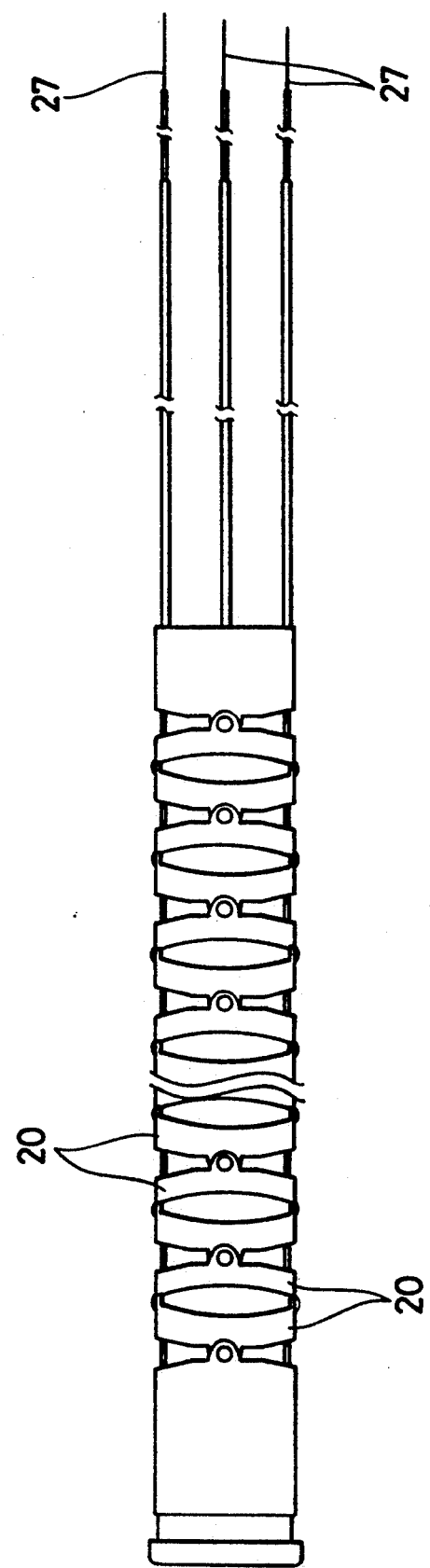

The bending section 2b has the function of turning the distal end section 2c in a desired direction. As shown in FIGS. 3 and 4, the bending section 2b is composed of a ring joint assembly of a plurality of bending rings 20 which are pivotally connected in vertical and horizontal directions alternately, and is covered with a net and a cover tube 21. The bending section 2b contains a light guide 22, an image guide 23, both consisting of optical fiber bundles, an instrument channel 24 for forceps or other instruments, a water-supply tube 25, and an air-supply tube 26.

The end portion of the light guide 22 is faced to the light emitting window 10 to form an image of the object to be observed. The end of instrument channel 24 is communicated with the instrument gateway 12. The water-supply tube 25 and air-supply tube 26 is joined in the distal end section 2c and the joined passage is communicated with the fluid nozzle 13. The contents consisting of light guide 22, image guide 23, instrument conduit 24, water-supply tube 25 and air-supply tube 26 are lengthwise members located along the full length of the insert portion 2 and then are fixed to the distal end section 2c. Each of the members contained in the insert portion 2 are flexible so as to be deformable in conformity with a bent or curved portion of the insert section 2.

Four operation wires 27 run in the insert portion 2. These operation wires 27 are so designed as to make the bending section 2b turn to the desired direction in a remote-control manner from the operating unit 1. One end of each of the operating wires 27 is secured to the foremost ring of the bending section 2b or the distal end section 2c, the other end thereof being wound around a pair of pulleys (not shown) mounted in the control unit 1. These pulleys can be manually rotated by means of a bending knob 4 provided on the control portion 1. The bending section 2b is turned up and down when the vertically disposed operation wires are pushed and pulled, and turned transversely when the horizontally disposed operation wires are pushed and pulled. The bending section 2b can be turned in a desired direction by combined operation of the pair of vertical wires and the pair of horizontal wires. The respective operation wires are spaced away from one another at angular intervals of about 90° by running them through pivots to connect adjacent the bending rings 20.

Figure 5:
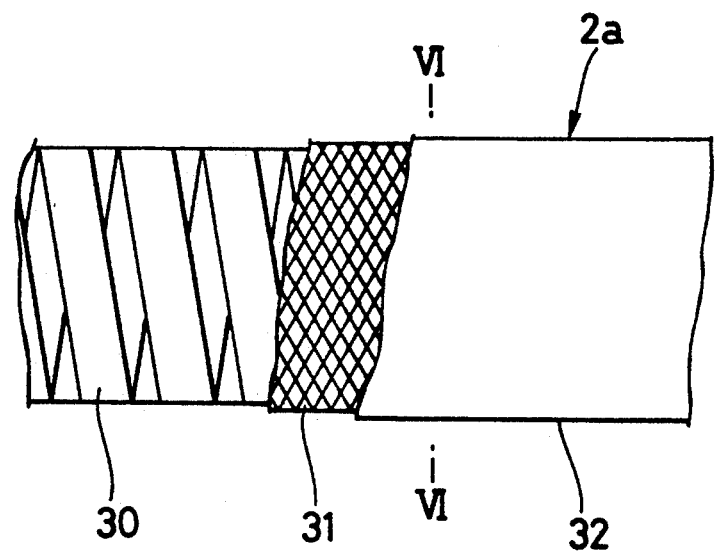

The flexible section 2a has an outer sheath, as shown in FIG. 5, a spiral tube 30 made by a spirally winding a metal strip, which is covered with a protection net 31 and an outer tube 32. As is obvious from FIG. 6, the light guide 22, image guide 23, instrument channel 24, water-supply tube 25 and air-supply tube 26 as illustrated in the bending section 2b are passed through the flexible section 2a. The operation wires 27 are also located in the flexible section 2a, but the operation wires 27 are not specifically restricted to their positions as they are in the bending sections 2b.

Figure 7:
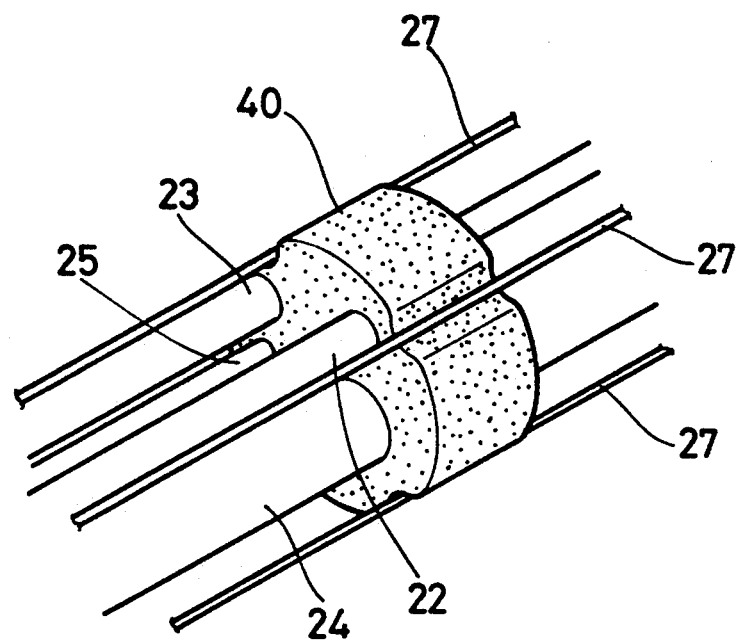

The flexible section 2a also incorporates restoring bodies 40 disposed at three places, one of which is near the bending section 2b, another being near the junction point with the control unit 1 and the other in a middle portion thereof. The restoring bodies 40 are elastic members made of such materials as foamed silicone or urethane rubber with low elastic stress and high elastic stability adapted to expand and contract freely. The restoring bodies 40 have outside diameters large enough to closely abut the inner wall of the flexible section 2a and are of a width large enough to maintain adequate elastic stability, as shown in FIG. 7. The light guide 22, image guide 23, instrument channel 24, water-supply tube 25 and air-supply tube 26 are all passed through the restoring bodies 40. The members thus passed may be either fastened to the restoring members 40 or slidably fitted therein. By adopting the slide-free fitting manner of the members, good bending and other operations are facilitated. As is obvious from FIG. 7, the operation wires 27 are not fitted in the restoring bodies 40, but this is not essential.

The manner of making the restoring bodies 40 of foamed silicon rubber is given below as one example. A predetermined quantity of two liquid materials are applied to the members to be inserted into the insert portion 2 at room temperature. Thereafter, the members are inserted into the flexible section 2a, then the liquid materials are allowed to become foam. This method permits forming foam without employing heat and pressure. The reaction heat resulting from the foaming process can be suppressed so as to be relatively low, so that the light guide 22, image guide 2 and other passed members remain undamaged.

To pass the insert section 2 into a body cavity, etc. for inspection or observation, the flexible section 2a is inserted so as to follow a curved course, with the bending section 2b turned or bent to a desired direction. Then, the light guide 22, image guide 23, instrument channel 24, water-supply tube 25 and air-supply tube 26 in the insert section 2 are pushed to the inner side of the curved or turned area, with a tension force to pull the passed members toward the distal end section 2c to which they are fastened.

Figure 8A:
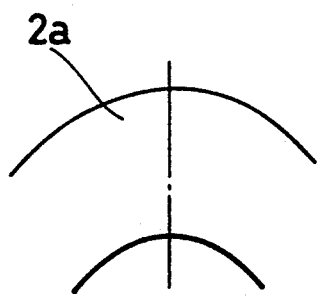
Figure 8B:
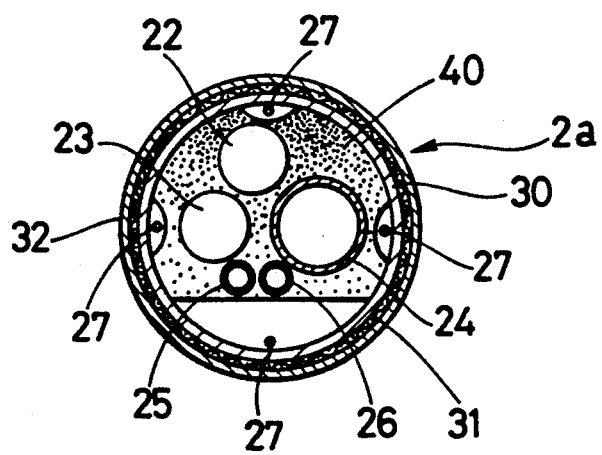

The content members in the flexible section 2a are passed through the restoring bodies 40 of an elastic material with extremely low elastic stress. In the case where a restoring body 40 is positioned at a curved portion as shown in FIG. 8 (a), the restoring body 40 is moved toward the inner side of the flexible section 2a without resistance as shown in FIG. 8 (b), thereby gathering the content members at the side of the curved inner side of the bending section 2b by the compression of the restoring body 40. However, the lengthwise members can certainly be maintained as they are by the partitional function of the restoring body 40. The restoring body 40 acts as a buffer member for protecting each of the pushed or compressed members contained in the insert portion 2. By slidable engagement of the contents of the insert portion 2 with the restoring body 40, these lengthwise members do not resist curving of the bending section 2b, and thereby no tension or oppression is exerting thereon. Remaining portions of the lengthwise content members are freely moved according to the bending or curving of the insert portion 2, thus exerting no additional resistance to the flexibility of the insert portion 2.

Figure 6:
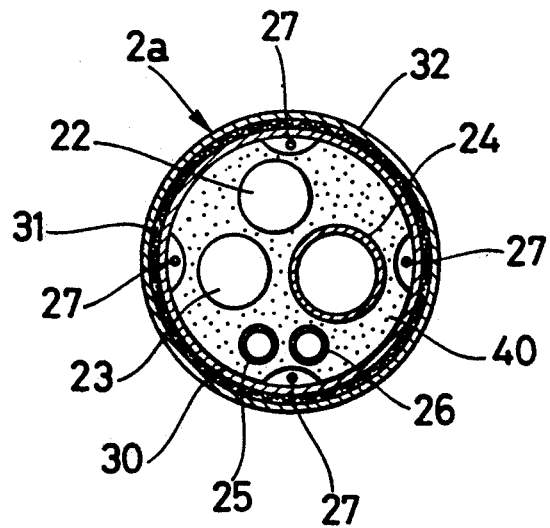

When reviving the flexible section 2a and bending section to the straight position, the restoring body 40 can quickly be restored to its original shape as shown in FIG. 6 by virtue of the elasticity thereof. Then, the lengthwise substances contained in the flexible section 2a are certainly restored to their predetermined original positions. Therefore, the members of the insert portion 2 do not entwine with each other, or compress and push each other. Since the members always return to their original positions when the force has been removed without making cumulative displacement thereof, there arises no problem of jamming the content members at any localized portion even if they are repeatedly operated. Therefore, problems can effectively be avoided such as the control wires 27 becoming entangled with the light guide 22, image guide 23, instrument channel 24, and the like.

As a result, the risk of potential damage, such as breaking of the light guide 22 and image guide 23 (or a cable in an electronic endoscope) and the kinking or buckling of the instrument conduit 24, water-supply tube 25 and air-supply tube 26, can significantly be reduced.

Figure 9:
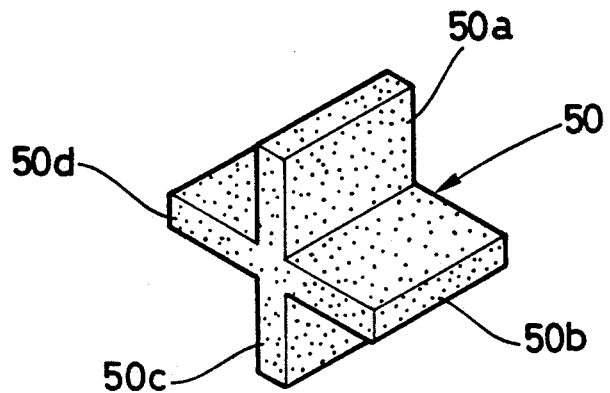
FIGS. 9 and 10 show a second preferred embodiment of this invention.
Figure 10:
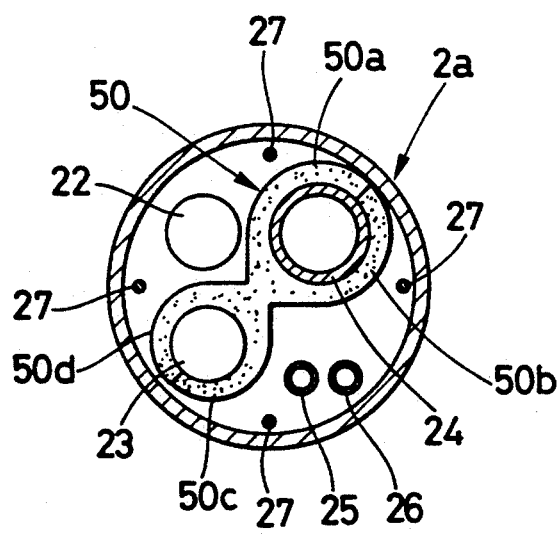
Figure 11:
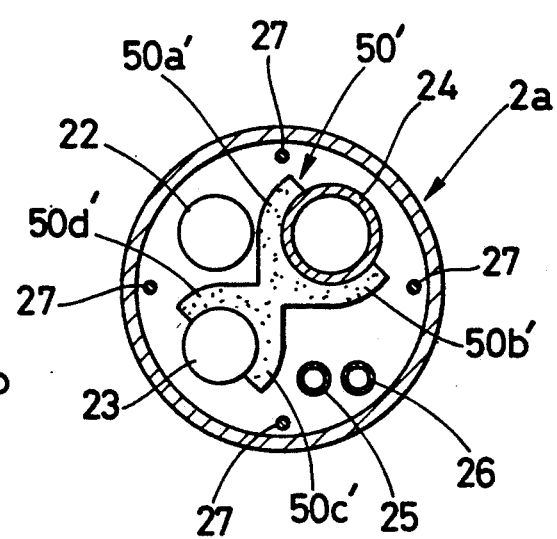
FIG. 11 is schematic view of a piece of sponge fitted in an area of the flexible segment of a third preferred embodiment of this invention, with omitted details of the sheath member.

Although in the above-mentioned embodiment the restoring bodies 40 are provided at three places along with the flexible section 2a, the object of the protection of the members in the insert portion 2 can be attained by providing only one restoring member 40 near the junction point of the flexible section 2a with the bending section 2b, that is, where the members in the insert section 2 have minimal axial movement in the turning operation of the bending section 2b. The lengthwise content members can be more stable by utilizing as many restoring bodies 40 as possible, including at the bending section 2b. Such materials as sponge 50 or the like of a cross-shape, as shown in FIG. 9, may be used in place of the foamed restoring body. Further, two loops may be formed by joining together the ends 50a and 50b and the ends 50c and 50d of adjoining upright and transverse beams by either bonding or stitching as shown in FIG. 10. For example, the image guide 23 may be passed through one of the two loops and the instrument channel 24 through the other of the two loops, with the light guide 22 being passed through a space on one side thereof and the water-supply tube 25 and air-supply tube 26 on the other. Also, a cross-shaped sponge 50' with relatively short upright and transverse beams 50a'-50d', as shown in FIG. 11, may be used. Further, the beams 50a' and 50b' may cover the outside of the image guide 23, the beams 50c' and 50d' covering the exterior of the instrument channel 24. The restoring bodies may be constructed in many other ways, such as by providing through holes for the passed members in a cylindrical piece of sponge.

Obviously, numerous modifications and variations of the present invention are possible in light of the above teachings. It is therefore to be understood that, within the scope of the appended claims, the invention may be practiced otherwise than as specifically described herein.

What is claimed is:

1. An endoscope which comprises:
   a flexible insert portion adapted to be inserted into an object to be inspected;
   a plurality of lengthwise members including at least an optical fiber bundle for transmitting illuminating light to said object and a channel member which are provided within said flexible insert portion in a freely movable manner and;
   at least one elastic restoring body which is elastically compressible in a cross-sectional direction of said flexible insert portion in a flexible section of said flexible insert portion so as to partition said lengthwise members off from each other;
   wherein said elastic restoring body allows for movement of said lengthwise members in a cross-sectional plane of said flexible insert portion in arbitrary directions while keeping said lengthwise members partitioned off from each other when said flexible insert portion is bent, and restoring said lengthwise members to their predetermined original positions when said insert portion is straightened.

2. The endoscope according to claim 1, wherein said restoring body is provided at three separate locations in the insert section, respectively, at a first location near a bending section, at a second junction position of said insert section with respect to a control unit, and a third, midway position of said first and second positions.

3. The endoscope according to claim 1, wherein said restoring member comprises foamed rubber.

4. The endoscope according to claim 3, wherein said restoring body is made of two-liquid foamed rubber materials that are allowed to foam by mixing two liquids so as to react with each other.

5. The endoscope according to claim 1, wherein said restoring body comprises a piece of sponge shaped to partition the cross-sectional space in said insert section into a desired number of sections.

* * * * *